2,911,413

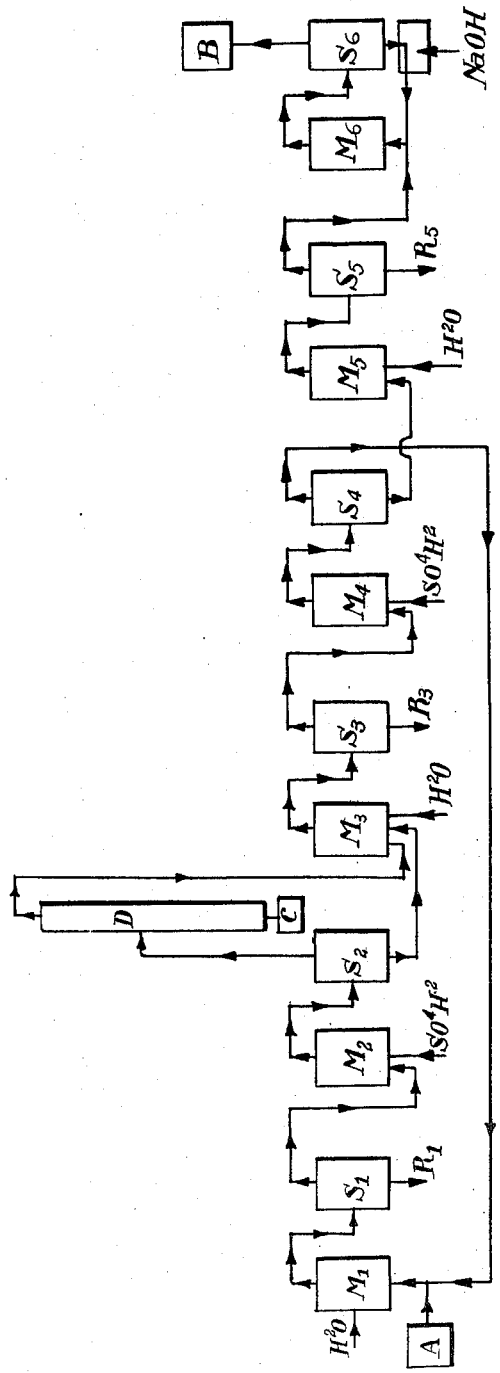

PURIFICATION PROCESSES FOR SULPHURIZED PRODUCTS EXTRACTED FROM PETROLEUM

André Gislon and Robert Lucien Putters, Paris, France, assignors to Compagnie Francaise de Raffinage, Paris, France, a society of France Application June 8, 1953, Serial No. 360,396

Claims priority, application France March 5, 1953

8 Claims. (Cl. 260—327)

It is known that the spent acids which have been used for the sulphuric-acid refining of petroleum products contain sulphurated organic compounds, particularly monocyclic or polycyclic polymethylene sulphides and sulphonic acids. For example, such acids contain thiophanes, perhydrothiophenes, saturated cyclic organic sulphur compounds and thiocyclanes. See Thierry, Journal of the Chemical Society, volume 127, pages 2756–59 (1925); Mabery and Quale, Journal of the American Chemical Society, volume 28, page 404 (1906).

It is also known that it is possible to recover the polymethylene sulphides contained in the spent acid, either by dilution with water or by aqueous solutions, or by steam distillation, or by a combination of these methods. See Pemberton, U.S. Patent 24,952 (1859); Thierry, supra; German Patent 261,777; Millochan, U.S. Patent 37,918 of 1863; Borgstrom and McIntire, Industrial and Engineering Chemistry, volume 22, page 87 (1930); Teutsch, Petr. Zeit. (20), 30 (1934); Friedmann and Canesso, Refiner (1942); Polley, Byrns and Bradley, Industrial and Engineering Chemistry, volume 34, page 755 (1942).

Nevertheless the polymethylene sulphides obtained by such treatment are always contaminated by other substances which are insoluble in water, such as hydrocarbons and organic disulphides or polysulphides which are dissolved in the spent sulphuric acid because of the presence of sulphonic acids and also because of their high concentration in the fractions of the petroleum products.

The object of the present invention is to provide a purification process making it possible to separate, from the crude sulphur oils obtained from the spent acids which have been used for sulphuric acid refining of petroleum products, or from said spent acids, the monocyclic and/or polycyclic polymethylene sulphides substantially free from the non-sulphurized products and from the organic disulphides and/or polysulfides which contaminate them. When the spent acids themselves are used as the starting material, said acids are treated with a diluent consisting of a mixture of water and inert or reactive hydrocarbons which are unaffected by and are only slightly soluble in cold concentrated sulphuric acid. In the case when crude sulphurized oils previously obtained from such spent acids are used as the starting material, said oils are diluted with such unreactive hydrocarbons thereby forming a solution of the sulphurized oil.

In principle, the process according to the invention is characterised by the following sequence of operations:

(1) The crude sulphurized oil—obtained by any known process, for example by diluting spent sulphuric acids in water—is diluted in a hydrocarbon;

(2) The sulphurized oil solution is subjected to an extraction by sulphuric acid;

(3) By a fresh separation of the acid layer and by the dilution thereof in water, a polymethylene sulphide is obtained having high degree of purity.

In the practical embodiments of this process, the choice of the hydrocarbon used for the first extraction, as well as the operational methods, should be determined by the following conditions.

The hydrocarbon should have a low viscosity, have a boiling point outside the range of boiling temperatures of the purified sulphurized polymethylene to be obtained, have a slight solubility in cold concentrated sulphuric acid and should not react with the latter under these conditions. As a specific example, it has been found that it is possible to use a straight or branched chain aliphatic hydrocarbon, a monocyclic or polycyclic saturated hydrocarbon, alkylated or non-alkylated, or a mixture of these hydrocarbons.

The extraction by means of sulphuric acid is carried out at room temperature or at a lower temperature, by the acid in the cold concentrated state, and in a proportion less than, or at the most equal to, 10 kg. acid per kg. sulphur contained in the solution in the form of polymethylene sulphides. The polymethylene sulphides are extracted selectively from the acid layer.

The latter is carefully separated from the hydrocarbonated layer devoid of the compounds sought, then the polymethylene sulphides are separated from the acid by known methods (dilution in water, steam distillation or like process).

The process according to the invention may comprise various modifications.

In particular, according to the concentration of the sulphides sought in the crude sulphurized oil, and the degree of purity required of the polymethylene sulphides after separation, several successive purifications could be carried out in accordance with the cycle given above.

On the other hand, and particularly if the sulphurized oil to be refined is viscous, the separation of the crude oil, starting with the spent acids, can be effectively carried out by hydrolysis of the acids in water in the presence of the selected non-reactive hydrocarbon. The separation of the layers is thus sharply improved and the solution of crude oil in the hydrocarbon is immediately ready for the succeeding purifications:

The following specific examples, illustrate, the characteristics of the invention and its modifications.

Example 1

6 kg. of Edeleanu extract of a Middle Eastern solvent are treated with 300 g. of 97% sulphuric acid. The layer of spent acid is decanted and diluted with water, which makes it possible to obtain 100 g. of a crude sulphurized oil which is found to contain

|  | Percent |
|---|---|
| Sulphur | 18.9 |
| Carbon | 70.1 |
| Hydrogen | 11.1 | and having an average molecular weight of 142, which corresponds to the analysis of a mixture of sulphurized products and hydrocarbons. This crude oil is found to contain 1.1% sulphur in the form of disulphides.

100 g. of this oil are diluted in 2 litres of n-heptane; the mixture is agitated for 10 minutes in the presence of 180 g. of 100% sulphuric acid, cooling with iced water to prevent the temperature of the mixture from exceeding 5° C.

After allowing it to rest for thirty minutes, 240 g. of the acid lower layer are poured off, and poured over 400 g. of ice. It is allowed to rest for several hours and 60 g. of the supernatant layer are finally separated, the analysis of which is:

|  | Percent |
|---|---|
| Sulphur | 22.1 |
| Carbon | 66.4 |
| Hydrogen | 11.1 |

Average molecular weight: 143.

This analysis corresponds to the empirical formula:

$$C_{7.91}H_{15.87}S_{0.99}$$

that is to say to 99% pure polymethylene sulphide (with the general formula $C_nH_{2n}S$). In particular, the amount of sulphur found in the form of disulphides is only 0.2%.

*Example 2*

A crude sulphurized oil having the composition:

| | Percent |
|---|---|
| Sulphur | 16.5 |
| Carbon | 73.3 |
| Hydrogen | 10.1 | and an average molecular weight of 177 has been obtained by dilution in water of the sulphuric acid used to refine paraffin oil.

A first treatment of a solution of 100 g. of this oil in 1 litre of iso-octane per 160 g. of 98% sulphuric acid, produces 250 g. of lower layer, which is diluted in iced water.

80 g. of oil forming an upper layer are then decanted the composition of which is:

| | Percent |
|---|---|
| Sulphur | 18.6 |
| Carbon | 70.0 |
| Hydrogen | 11.2 |

Average molecular weight 168.

This analysis, corresponding to the empirical formula $$C_{9.8}H_{18.8}S_{0.98}$$

shows that the refined oil is about 98% pure.

78 g. of this oil are dissolved in 1 litre of n-heptane and the solution is treated with 140 g. 98% sulphuric acid. The 210 g. of lower layer are separated, and diluted in iced water. The decanted upper layer, weighting 70 g. has the analysis:

| | Percent |
|---|---|
| Sulphur | 19.4 |
| Carbon | 69.6 |
| Hydrogen | 11.1 |

Average molecular weight 165; hence the empirical formula $$C_{9.6}H_{18.3}S_{1.00}$$

*Example 3*

220 g. of spent acid have been obtained in the course of treating 1 kg. of Edeleanu extract of a paraffin oil with sulphuric acid.

This spent acid is agitated in the presence of 500 g. cyclohexane and 500 g. of water are added gradually.

The agitation is then stopped; 530 g. of clear supernatant layer are decanted in less than 10 minutes. This layer is then treated with 70 g. of 100% sulphuric acid. 105 g. of the bottom layer are obtained and these are diluted with iced water.

After being allowed to rest for 2 hours, 31 g. of the oily supernatant layer has the following analysis:

| | Percent |
|---|---|
| Sulphur | 19.7 |
| Carbon | 69.5 |
| Hydrogen | 10.9 |

Average molecular weight: 162. This analysis corresponds to the empirical formula:

$$C_{9.4}H_{17.7}S_{1.00}$$

that is to say to polymethylene sulphides with a high degree of purity.

*Example 4*

This example, which is illustrated on the accompanying flow-sheet relates to an application of the invention to a continuous two-stage purification process. It combines the modification consisting in submitting the product to two successive purifications and that consisting in diluting sulphuric acid in the presence of a non-reactive hydrocarbon.

In the flow-sheet, the reference letters M, S and R, with various suffixes, designates respectively mixers, separators, and the drawing-off of water-sulphuric acid-sulphonic acid mixtures.

The non-reactive hydrocarbon, in this example, is a light petrol boiling between 40° C. and 100° C. which has previously been refined with sulphuric acid.

At A, a unit for the sulphuric-acid refining of paraffin oil supplies the mixer $M_1$ in the purification apparatus with spent acid at the rate of 2,000 kg. per hour. This mixer $M_1$ also receives the layer of non-reactive hydrocarbon coming from the separator $S_4$, and water. The temperature of the product is kept below 10° C. by a refrigeration system.

The separator $S_1$ separates a bottom layer, which is drawn off at $R_1$ and which is composed of water, sulphuric acid, sulphonic acids and tarry products of polymerisation and oxidation, and an upper layer comprising chiefly the non-reactive hydrocarbon in which is dissolved the sulphurized oil to be purified.

The top layer is treated at 10° C. with sulphuric acid in the mixer $M_2$. The polymethylene sulphides are dissolved selectively in the sulphuric acid. A separator $S_2$ then permits the hydrocarbon phase to be isolated and it passes into the redistillation tower D while the acid phase passes to the mixer $M_3$. The latter is supplied with water and non-reactive hydrocarbon regenerated by the redistillation D, and the temperature is prevented from rising by refrigeration.

The distillation residues (heavy hydrocarbons and polysulphides) are collected at C.

The polymethylene sulphides then pass into solution in the hydrocarbon layer which is separated from the acid-water layer in the separator $S_3$. The acid-water layer is drawn off at $R_3$.

A second purification treatment by sulphuric acid is carried out in the mixer $M_4$. The separator $S_4$ isolates the non-reactive hydrocarbon layer which is only very slightly polluted by traces of heavy hydrocarbons and organic polysulphides; this hydrocarbon is recycled as indicated above, to the mixer $M_1$. The bottom layer is a solution of pure polymethylene sulphides in sulphuric acid. Dilution of the acid with water in the mixer $M_5$ and decantation in the separator, provide an oil contaminated only by traces of sulphuric acid and sulphurous gas. At $R_5$ the bottom layer is drawn off. Washing in dilute soda which is recirculated through the mixer $M_6$ and the separator $S_6$, makes it possible finally to obtain 150 kg. per hour of an oil which has the analysis:

| | Percent |
|---|---|
| Sulphur | 17.4 |
| Carbon | 71.5 |
| Hydrogen | 11.2 |

Average molecular weight 184; hence the empirical formula:

$$C_{10.9} \quad H_{20.5} \quad S_{1.0}$$

which corresponds to monocyclic polymethylene sulphides $C_n H_{2n} S$ and dicyclic polymethylene sulphides $C_nH_{2n-2}S$ completely free of hydrocarbons and other types of sulphurized compounds.

The light petrol used in this plant can be replaced by liquid butane, the boiling of which in the mixers $M_1$ to $M_5$ inclusive prevents the rise in temperature in the course of the sulphuric hydrolytic extraction treatments.

We claim:

1. A process for the separation of cyclic polymethylene sulphides from non-sulphurized products as well as organic multi sulphides which contaminate said sulphides, said cyclic polymethylene sulphides and said contaminants being present in the spent acid derived from sulphuric acid refining of petroleum products, which comprises the following steps: (a) treating said acid with a diluent comprising a mixture of water and a hydrocarbon which is non-reactive with and only slightly soluble in cold concentrated sulfuric acid and selected from the group of hydrocarbons consisting of straight and branched chain aliphatic hydrocarbons, mono-cyclic and polycyclic saturated hydrocarbons, alkylated and non-alkylated derivatives thereof, and mixtures thereof; (b) extracting the sulphur oil solution so obtained with cold concentrated sulphuric acid, said sulphuric acid being present in a proportion not greater than 10 kilograms of sulphuric acid per kilogram of sulphur contained in the solution in the form of said polymethylene sulphides; (c) and finally separating the acid layer so formed, diluting said acid layer with water and collecting said polymethylene acids contained in an upper layer thereof.

2. A process for the separation and purification of cyclic polymethylene sulphides from contaminating non-sulphurized products and organic sulphide compounds present in the crude sulphur oils obtained from spent sulphuric acid used in sulphuric acid refining processes upon petroleum products which comprises the steps of (a) diluting said crude sulphur oils with a diluent comprising a mixture of water and a hydrocarbon which is non-reactive with and only slightly soluble in cold concentrated sulfuric acid and selected from the group of hydrocarbons consisting of straight and branched chain aliphatic hydrocarbons, mono-cyclic and polycyclic saturated hydrocarbons, alkylated and non-alkylated derivatives thereof, and mixtures thereof; (b) subjecting said sulphur oil solution so obtained to an extraction with cold concentrated sulphuric acid in a proportion not greater than 10 kilograms of sulphuric acid per kilogram of sulphur contained in said solution in the form of polymethylene sulphides; (c) and finally separating the thus formed acid layer, diluting said acid layer with water and thereupon collecting said polymethylene sulphides from an upper layer thereof.

3. A process according to claim 1 in which said sulphuric acid extraction and the dilution of the acid layer in water are carried out at the room temperature.

4. A process according to claim 1 in which said sulphuric acid extraction and the dilution of the acid layer in water are carried out below room temperature.

5. A process according to claim 2 in which said sulphuric acid extraction and the dilution of the acid layer in water are carried out at the room temperature.

6. A process according to claim 2 in which said sulphuric acid extraction and the dilution of the acid layer in water are carried out below room temperature.

7. In a process according to claim 2, a supplementary treatment comprising a further dilution with said hydrocarbon, sulphuric acid extraction, separation and dilution of the acid phase in water.

8. In a process according to claim 2, a repeated supplementary treatment comprising a further dilution with said hydrocarbon, sulphuric acid extraction, separation and dilution of the acid phase in water.

References Cited in the file of this patent

UNITED STATES PATENTS

| | | |
|---|---|---|
| 2,036,299 | Robinson | Apr. 7, 1936 |
| 2,183,860 | Coltof | Dec. 19, 1939 |
| 2,309,337 | Byrns | Jan. 26, 1943 |
| 2,402,639 | Lazier | June 25, 1946 |
| 2,427,988 | Wilson | Sept. 23, 1947 |
| 2,463,204 | Reich | Mar. 1, 1949 |
| 2,486,485 | Latchum | Nov. 1, 1949 |
| 2,511,251 | Feasley | June 13, 1950 |

OTHER REFERENCES

Thierry: J. Chem. Soc., vol. 127, pp. 2756–9 (1925).